(12) United States Patent
Stiesdal

(10) Patent No.: US 8,167,495 B2
(45) Date of Patent: May 1, 2012

(54) DEVICE COMPRISING A SUPPORT STRUCTURE AND A ROTATING SHAFT AND WIND TURBINE

(75) Inventor: Henrik Stiesdal, Odense C (DK)

(73) Assignee: Siemens Aktiengesellschaft, Munich (DE)

( * ) Notice: Subject to any disclaimer, the term of this patent is extended or adjusted under 35 U.S.C. 154(b) by 528 days.

(21) Appl. No.: 12/380,923

(22) Filed: Mar. 5, 2009

(65) Prior Publication Data

US 2009/0232429 A1 Sep. 17, 2009

(30) Foreign Application Priority Data

Mar. 12, 2008 (EP) .................................. 08004588

(51) Int. Cl.
*F16C 32/06* (2006.01)
(52) U.S. Cl. ................... 384/107; 384/100; 384/115
(58) Field of Classification Search .............. 384/100, 384/107, 115, 122, 155, 371, 375, 377, 438, 384/441; 310/254, 258–259, 266
See application file for complete search history.

(56) References Cited

U.S. PATENT DOCUMENTS

| | | | | |
|---|---|---|---|---|
| 3,421,799 A | * | 1/1969 | Sibley et al. | 384/115 |
| 4,065,279 A | * | 12/1977 | McCullough | 62/510 |
| 6,106,254 A | * | 8/2000 | Hirooka et al. | 418/55.6 |
| 6,249,058 B1 | * | 6/2001 | Rea | 290/55 |
| 6,623,238 B2 | * | 9/2003 | Langston et al. | 415/230 |
| 6,781,276 B1 | | 8/2004 | Stiesdal et al. | |
| 2006/0071575 A1 | * | 4/2006 | Jansen et al. | 310/266 |

FOREIGN PATENT DOCUMENTS

| | | | |
|---|---|---|---|
| CN | 1756051 A | | 4/2006 |
| EP | 1641102 A1 | | 3/2006 |
| FR | 786915 | | 9/1935 |
| GB | 1161895 | | 8/1969 |
| JP | 60157514 A | * | 8/1985 |
| JP | 08028578 A | * | 2/1996 |
| JP | 2000322820 A | * | 11/2000 |
| JP | 2007178268 A | * | 7/2007 |

OTHER PUBLICATIONS

Rasmussen et al, "Multipole, permanent magnet generator studies and planned prototypes", European Community Wind Energy Conference, Jan 1, 1993, pp. 643-650, XP000606076.
EPO Reply to Report of Examination, pp. 1-4 with amended claims, pp. 10-11, Jul. 12, 2010.
Rasmussen P et al: "Multipole, Permanent Magnet Generator Studies And Planned Prototypes" European Community Wind Energy Conference, pp. 643-650, XP000606076; Others; 1993.

* cited by examiner

*Primary Examiner* — Marcus Charles

(57) ABSTRACT

A device is provided having a support structure and a rotating shaft having a center axis which rotating shaft and support structure are pivotable supported against each other by at least one hydrodynamic rotary bearing including a first bearing part and a second bearing part pivotable relatively to each other, a lubricant and a contact zone between the first bearing part and the second bearing part at least when the hydrodynamic rotary bearing is at rest, wherein the rotating shaft and the support structure are shaped in such a way and the hydrodynamic rotary bearing is in such a way arranged on the rotating shaft and the support structure that the contact zone of the hydrodynamic rotary bearing is submerged in the lubricant even when the hydrodynamic rotary bearing is at rest.

14 Claims, 4 Drawing Sheets

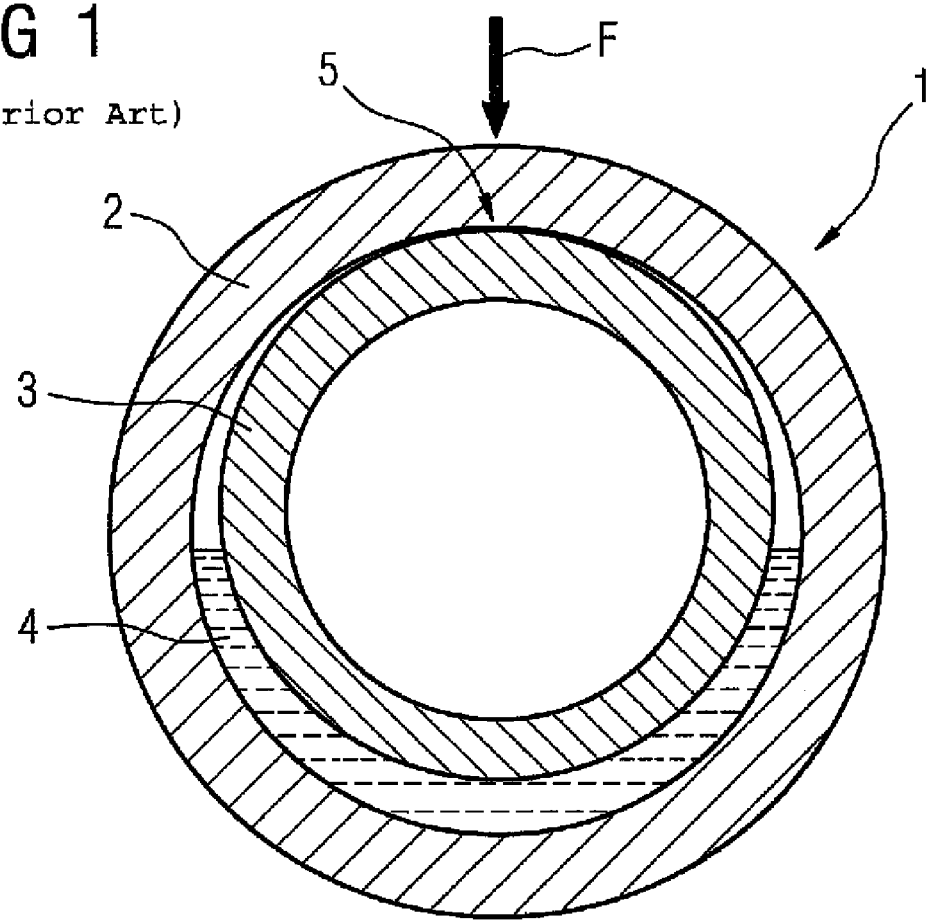

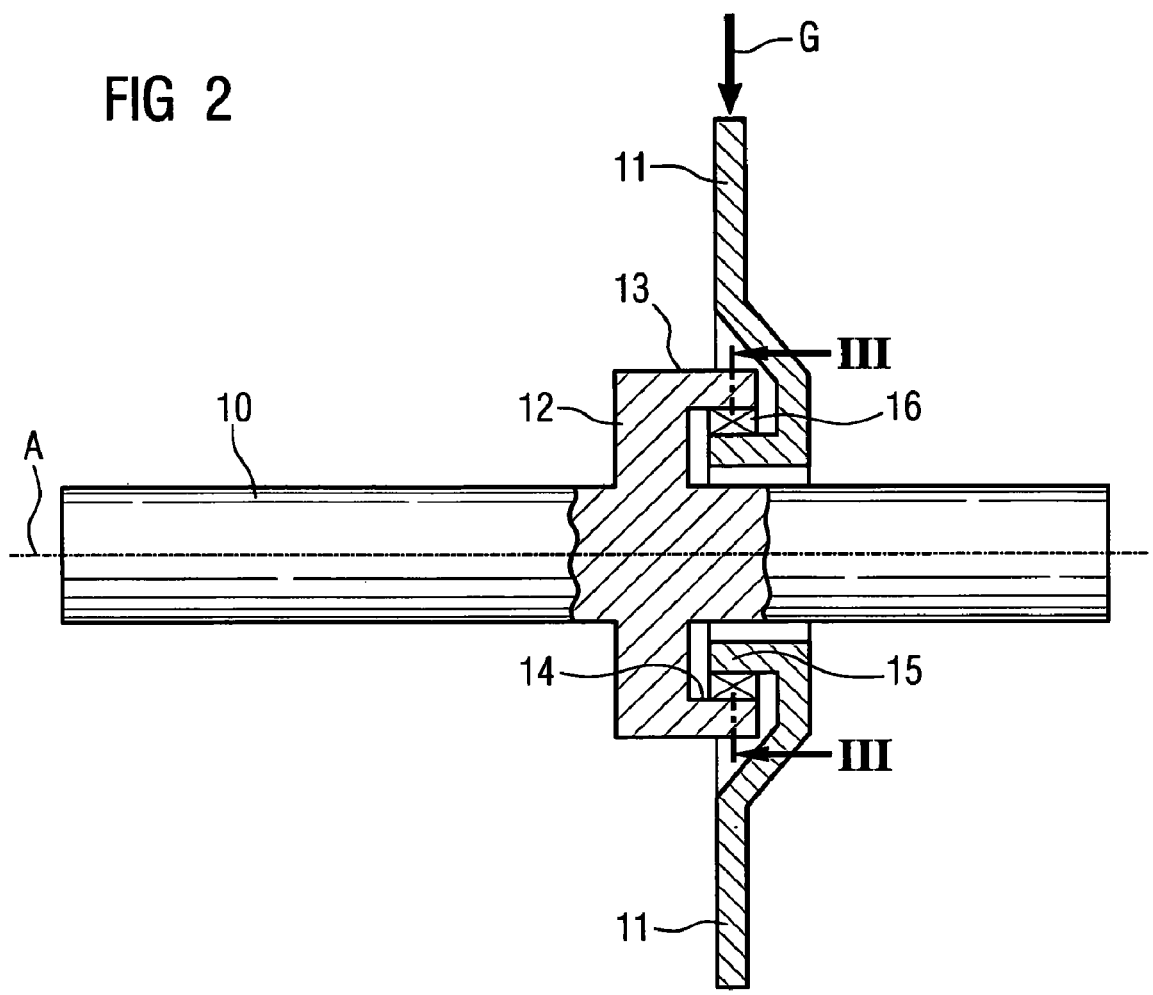
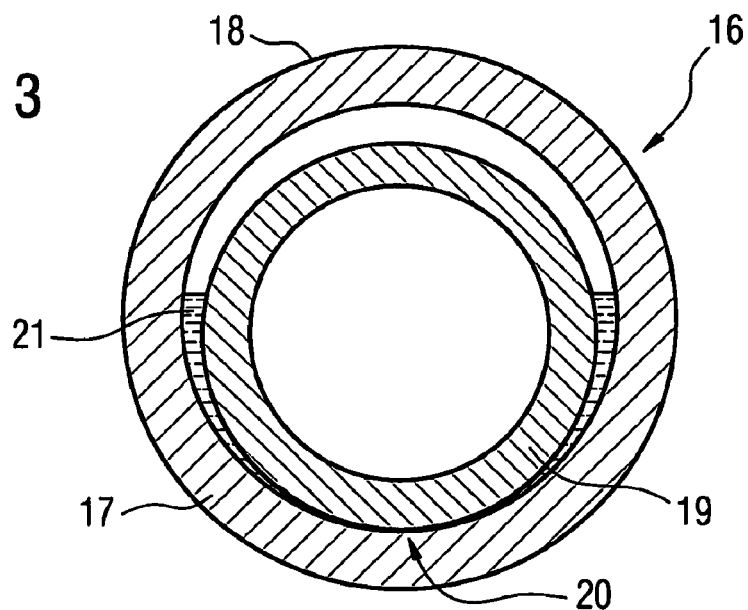

DEVICE COMPRISING A SUPPORT STRUCTURE AND A ROTATING SHAFT AND WIND TURBINE

CROSS REFERENCE TO RELATED APPLICATIONS

This application claims priority of European Patent Office application No. 08004588.3 EP filed Mar. 12, 2008, which is incorporated by reference herein in its entirety.

FIELD OF INVENTION

The invention relates to a device comprising a support structure and a rotating shaft which rotating shaft and support structure are pivotable supported against each other by means of at least one hydrodynamic rotary bearing. The invention concerns also a wind turbine comprising such a device.

BACKGROUND OF INVENTION

A hydrodynamic rotary bearing comprises e.g. an outer sleeve, an inner ring and a lubricant. The outer sleeve and the inner ring are pivotable relatively to each other. Under normal operating conditions the inner ring and the outer sleeve of the hydrodynamic rotary bearing are separated by a film of the lubricant. At start-up and shut-down of the hydrodynamic rotary bearing, i.e. when the speed of rotation e.g. of the inner ring relatively to the outer sleeve is low, this film of the lubricant is in general not able to carry the load on the hydrodynamic rotary bearing, and the inner ring and the outer sleeve come into direct contact. This leads to increased wear and is therefore undesirable.

In FIG. 1 a sectional view of a hydrodynamic rotary bearing 1 is shown wherein the hydrodynamic rotary bearing 1 is at rest. The hydrodynamic rotary bearing comprises an outer sleeve 2 which may be provided with a bushing, an inner ring 3 e.g. designed to receive a shaft or journal and a lubricant 4. If the hydrodynamic rotary bearing 1 is mounted with its centre axis of rotation oriented substantially in the horizontal direction, the lubricant 4 tends to collect in the lower part of the hydrodynamic rotary bearing 1 when the hydrodynamic rotary bearing is at rest. In this constellation the inner ring 3 is pressed against the upper part of the outer sleeve 2. The direction and the point of attack of the loading force are indicated by the arrow F in FIG. 1. This situation is typical for a static, gravitational load supported by a rotating, horizontal shaft, as opposed to the "normal" situation where a rotating shaft is supported by a static structure.

In the situation illustrated in FIG. 1 the inner ring 3 and the outer sleeve 2 remain in direct and dry contact in the contact zone 5 with each other on start-up until the inner ring 3 has rotated enough to carry lubricant, e.g. oil, into the contact zone 5. Because the contact zone 5 is at the upper part of the hydrodynamic rotary bearing 1, the inner ring 3 may have to rotate by as much as half a revolution before a load carrying film of lubricant can begin to develop. Thus there occur wear in the contact zone 5 which consequently shortens the lifetime of the hydrodynamic rotary bearing 1.

In U.S. Pat. No. 6,781,276 B1 a wind turbine having a direct drive generator is disclosed. The generator comprises a stator arrangement and a rotor arrangement located inside the stator arrangement. The rotor arrangement is attached to a rotor shaft. The stator arrangement is supported on the rotor shaft by two bearings, which can be hydrodynamic rotary bearings. In this case the load of the stator arrangement is carried by the parts of the hydrodynamic rotary bearings which are above the rotor shaft. When a wind turbine, in particular a generator of this or a similar design is at rest, the lubricant of the hydrodynamic rotary bearings tends to drain to the bottom of the hydrodynamic rotary bearings under the influence of gravity. When the wind turbine, in particular the generator starts up, the entire load of the stator arrangement will initially be carried by dry bearing surface to bearing surface contacts in the two hydrodynamic rotary bearings. Because the rotor shaft or the rotor arrangement may have to rotate a significant distance before lubrication can take effect, the hydrodynamic rotary bearings are prone to serious wear.

SUMMARY OF INVENTION

This problem could be mitigated by pumping lubricant into the contact zone of a hydrodynamic rotary bearing just before the rotor shaft and thus the inner ring of the hydrodynamic rotary bearing start to rotate. But for a wind turbine, whose rotor shaft starts rotating and is driven by wind, even when no electrical power is available, a solution based on an active pumping of lubricant may not be feasible.

It is therefore an object of the present invention to provide a device and a wind turbine as initially mentioned in such a way, that the wear during a start-up in a hydrodynamic bearing is reduced.

This object is inventively achieved by a device comprising a support structure and a substantially horizontal arranged rotating shaft having a centre axis which rotating shaft and support structure are pivotable supported against each other by means of at least one hydrodynamic rotary bearing comprising a first bearing part and a second bearing part pivotable relatively to each other, a lubricant as well as a contact zone between the first bearing part and the second bearing part at least when the hydrodynamic rotary bearing is at rest, wherein the rotating shaft and the support structure are shaped in such a way and the hydrodynamic rotary bearing is in such a way arranged on the rotating shaft and the support structure that the contact zone of the hydrodynamic rotary bearing is submerged in the lubricant even when the hydrodynamic rotary bearing is at rest. Thus the inventor proposes a passive solution wherein the design of the rotating, substantially horizontal arranged shaft, which preferably supports the static, gravitational load of the support structure, the design of the support structure of the device as well as the arrangement of the hydrodynamic rotary bearing on the rotating shaft and the support structure are in such a way that the contact zone of the first and the second bearing part of the hydrodynamic rotary bearing is in the lower half of the hydrodynamic rotary bearing, where the lubricant is available, when the hydrodynamic rotary bearing is at rest. In this way a load carrying film of lubricant is able to begin to develop as soon as e.g. the rotating shaft and thus e.g. the first bearing part of the hydrodynamic rotary bearing start rotating. As a consequence the occurrence of wear during the start-up of the hydrodynamic rotary bearing can be reduced.

Preferably the first bearing part of the hydrodynamic rotary bearing is an outer bearing sleeve arranged on the rotating shaft and the second bearing part of the hydrodynamic rotary bearing is an inner ring connected to the support structure.

According to an embodiment of the invention the rotating shaft comprises a first ring-shaped projection having an outer ring-shaped surface and an inner ring-shaped surface in relation to the centre axis of the rotating shaft, wherein the first bearing part, i.e. the outer bearing sleeve, of a first hydrodynamic rotary bearing is arranged on the inner ring-shaped surface of the first ring-shaped projection of the rotating shaft.

According to another embodiment of the invention the support structure comprises a first ring-shaped projection, wherein the first ring-shaped projection of the support structure is connected to the second bearing part, i.e. the inner ring of the first hydrodynamic rotary bearing. Thus the first ring-shaped projection of the support structure is at least partially arranged inside the first ring-shaped projection of the rotating shaft. At least a part of the weight and any other load on the support structure are transferred to the first hydrodynamic rotary bearing through the first ring-shaped projection of the support structure. The part of the weight and the load on the first ring-shaped projection of the support structure point downwards, thus the second bearing part of the first hydrodynamic rotary bearing, i.e. the inner ring, which is connected to the first ring-shaped projection of the support structure, experiences a force downwards, too. As a consequence the contact zone in the first hydrodynamic rotary bearing is at the lower part of the first hydrodynamic rotary bearing and therefore the contact zone is submerged in the lubricant, even when the first hydrodynamic rotary bearing is at rest.

In a further embodiment of the invention the rotating shaft comprises a second ring-shaped projection having an outer ring-shaped surface and an inner ring-shaped surface in relation to the centre axis of the rotating shaft, wherein the first bearing part of a second hydrodynamic rotary bearing, i.e. the outer bearing sleeve, is again arranged on the inner ring-shaped surface of the second ring-shaped projection of the rotating shaft.

According to another embodiment of the invention the support structure comprises a cylindrical or a second ring-shaped projection, wherein the cylindrical or second ring-shaped projection of the support structure is connected to the second bearing part of the second hydrodynamic rotary bearing, i.e. the inner ring. The cylindrical or second ring-shaped projection of the support structure is at least partially arranged inside the second ring-shaped projection of the rotating shaft. In a similar way as described before a part of the weight and any other load on the support structure are transferred to the second hydrodynamic rotary bearing through the cylindrical or the second ring-shaped projection of the support structure. The part of the weight and the load on the cylindrical or second ring-shaped projection of the support structure point downwards, thus the second bearing part of the second hydrodynamic rotary bearing, i.e. the inner ring, which is connected to the cylindrical or the second ring-shaped projection of the support structure, experiences a force downwards, too. As a consequence the contact zone in the second hydrodynamic rotary bearing is at the lower part of the second hydrodynamic rotary bearing and therefore the contact zone is submerged in the lubricant, even when the second hydrodynamic rotary bearing is at rest.

According to a variant of the invention the rotating shaft carries a rotor arrangement of a generator. According to another variant of the invention the support structure is a support structure of a stator arrangement of a generator. Preferably the generator is a direct drive or directly driven generator provided for a wind turbine.

The object of the present invention is also inventively achieved by a wind turbine comprising a device as described before.

BRIEF DESCRIPTION OF THE DRAWINGS

The invention will in the following be explained in more detail with reference to the schematic drawings, wherein FIG. 1 shows a sectional view of a hydrodynamic rotary bearing at rest in a prior art configuration, FIG. 2 demonstrates the principle of the invention, FIG. 3 shows a sectional view of the hydrodynamic rotary bearing of the device of FIG. 2 in the directions of the arrows III.

DETAILED DESCRIPTION OF INVENTION

Figure 4:
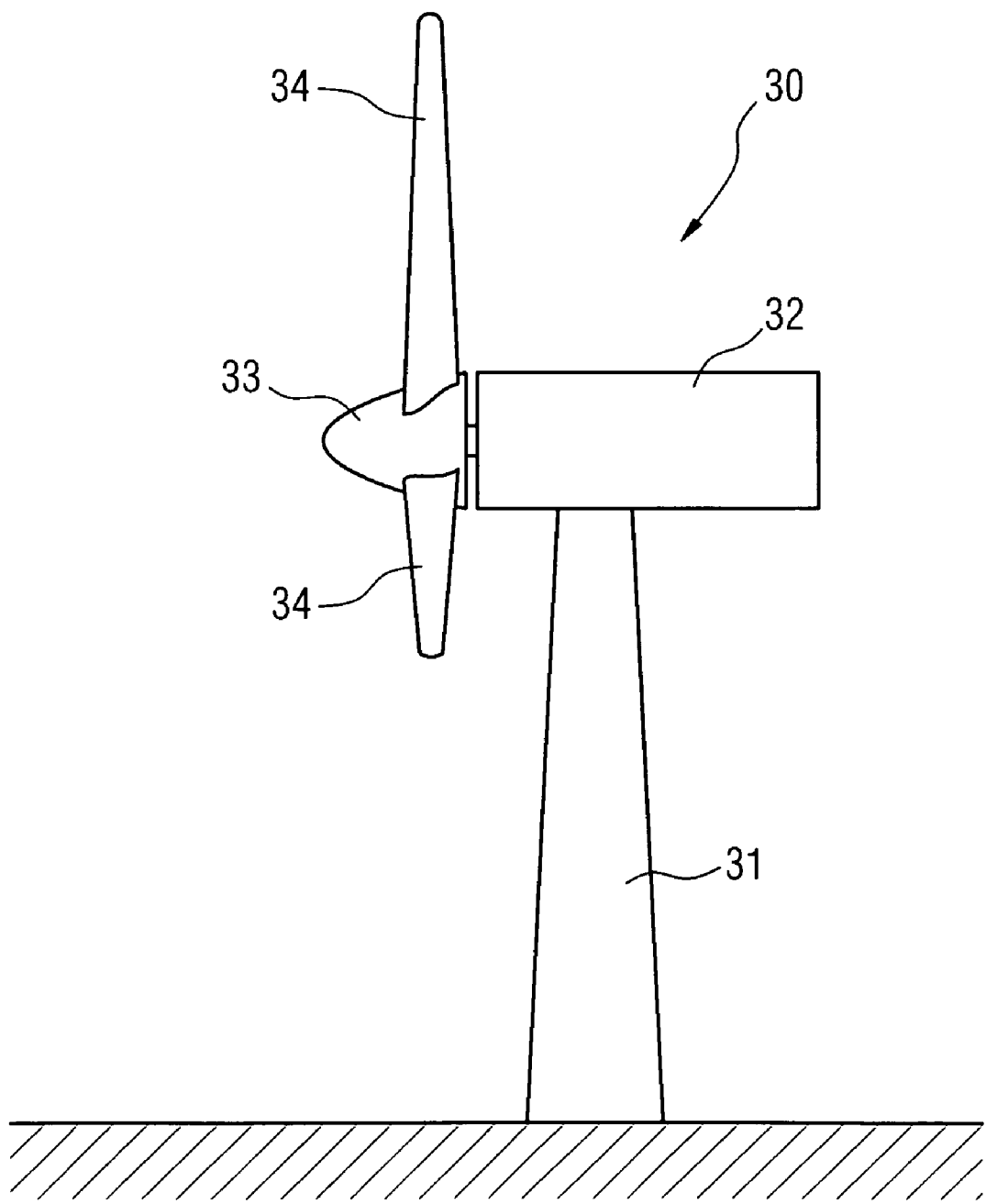
FIG. 4 shows a wind turbine and FIG. 5 shows a generator arrangement of the wind turbine of FIG. 4.

FIG. 2 shows schematically the principle of the present invention on the example of a substantially horizontal arranged rotating shaft 10 and a part of a support structure 11. The rotating shaft 10 having a centre axis A comprises a ring-shaped projection 12. The ring-shaped projection 12 comprises an outer ring-shaped surface 13 and an inner ring-shaped surface 14 in relation to the centre axis A of the rotating shaft 10. The support structure 11 comprises also a ring-shaped projection 15. A hydrodynamic rotary bearing 16 is arranged on the ring-shaped projection 12 of the rotating shaft 10 as well as on the ring-shaped projection 15 of the support structure 11. Thus the rotating shaft 10 and the ring-shaped projection 12 can rotate relatively to the support structure 11.

The hydrodynamic rotary bearing 16 comprises in a not explicitly shown manner an outer bearing sleeve fixedly attached to the inner ring-shaped surface 14 of the ring-shaped projection 12 and an inner ring fixedly connected to the ring-shaped projection 15 of the support structure 11.

The weight of the support structure 11 and a loading force G acting on the support structure 11 point downwards, so that the upper part of the support structure 11 experiences a force in the direction of the rotating shaft 10, whereas the lower part of the support structure 11 experiences a force in the direction away from the rotating shaft 10. Thus the contact zone in the hydrodynamic rotary bearing 16 is at the lower part of the hydrodynamic rotary bearing 16 and therefore the contact zone is submerged in the lubricant of the hydrodynamic rotary bearing 16, even when the hydrodynamic rotary bearing 16 is at rest. In FIG. 3 this situation is depicted in the style of FIG. 1.

FIG. 3 shows schematically a sectional view of the hydrodynamic rotary bearing 16 of the device of FIG. 2 in the directions of the arrows III, when the rotating shaft 10 and the outer bearing sleeve 17 of the hydrodynamic rotary bearing 16 are at rest. Thereby the outer surface 18 of the outer bearing sleeve 17 is fixedly attached to the inner ring-shaped surface 14 of the ring-shaped projection 12 of the rotating shaft 10 and the inner ring 19 of the hydrodynamic rotary bearing 16 and the ring-shaped projection 15 of the support structure 11 are fixedly connected to each other. Because of the weight of the support structure 11 and the loading force G, the inner ring 19 contacts the sleeve 17 in a contact zone 20, which is submerged in the lubricant 21 of the hydrodynamic rotary bearing 16, when the hydrodynamic rotary bearing 16 is at rest. In this way the wear in the hydrodynamic rotary bearing 16 can be reduced during start-up of the hydrodynamic rotary bearing 16, wherein the substantially horizontal arranged rotating shaft 10 supports a static, gravitational load.

Figure 5:
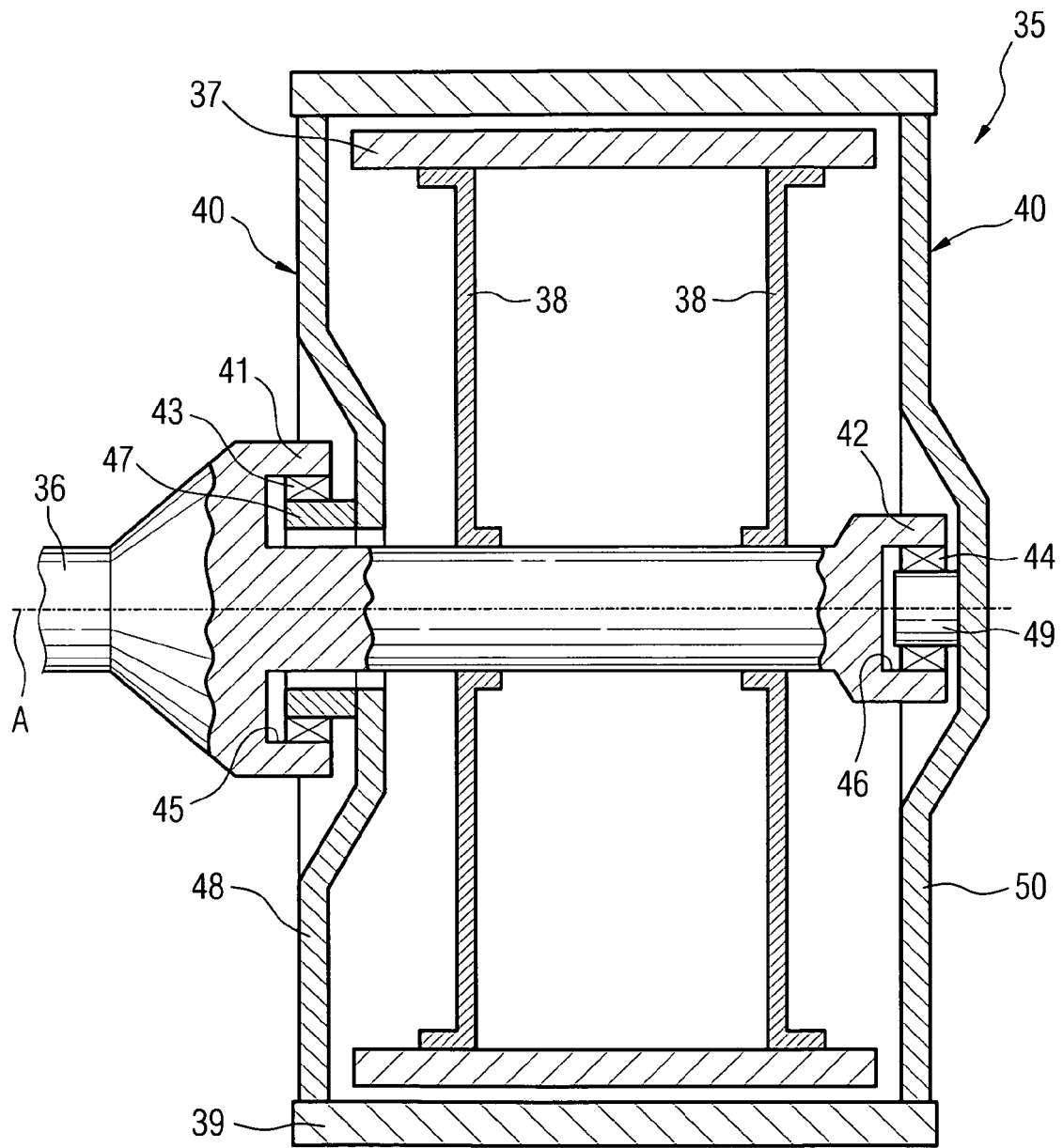

In FIGS. 4 and 5 an application of the invention in a wind turbine is illustrated. The wind turbine 30 according to FIG. 4 comprises as usual a tower 31, a nacelle 32 and a wind turbine rotor having a hub 33 and rotor blades 34. A direct drive generator 35 is arranged in the nacelle 32 and connected to a rotating shaft 36, which is connected to the hub 33.

In case of the present embodiment of the invention the generator rotor 37 is fixedly attached to the rotating shaft 36 via a number of spokes 38. The generator stator 39 is arranged around the generator rotor 37. A support structure 40 carries the generator stator 39.

The rotating shaft 36 having a centre axis A comprises a first ring-shaped projection 41 and a second ring-shaped projection 42. Into the first ring-shaped projection 41 a first hydrodynamic rotary bearing 43 and into the second ring-shaped projection 42 a second hydrodynamic rotary bearing 44 are fitted. A not explicitly shown sleeve of the first hydrodynamic rotary bearing 43 is attached to the inner ring-shaped surface 45 of the first ring-shaped projection 41 and a not explicitly shown sleeve of the second hydrodynamic rotary bearing 44 is attached to the inner ring-shaped surface 46 of the second ring-shaped projection 42.

A support ring 47 of the support structure 40 is fitted inside the first hydrodynamic rotary bearing 43 and the support ring 47 of the support structure 40 is fixedly connected to a not explicitly shown inner ring of the first hydrodynamic rotary bearing 43 respectively. The support ring 47 is attached to a kind of disk 48 of the support structure 40, which supports the generator stator 39 at the first end. Inside the second hydrodynamic rotary bearing 44 a solid cylinder 49 of the support structure 40 is fitted and the solid cylinder 49 of the support structure 40 is connected to a not explicitly shown inner ring of the second hydrodynamic rotary bearing 44 respectively. The cylinder 49 is attached to another kind of disk 50 of the support structure 40, which supports the generator stator 39 at the second end.

The loading forces of the stator arrangement comprising the generator stator 39 and the support structure 40 on both the support ring 47 and the solid cylinder 49 are directed downwards, so that each contact zone in each hydrodynamic rotary bearing 43, 44 is at the lower part of the respective hydrodynamic rotary bearing 43, 44 and therefore submerged in the respective lubricant of the hydrodynamic rotary bearing 43, 44 at all times.

In conventional rotating shaft-support structure-hydrodynamic rotary bearing-arrangements the loading forces are typically transferred to the hydrodynamic rotary bearing through the upper part of its outer sleeve in a substantially horizontal arrangement. According to the invention the loading forces are transferred through the lower part of the inner surface of a hydrodynamic rotary bearing thereby reducing wear.

The invention claimed is:

1. A device, comprising:
a hydrodynamic rotary bearing, comprising:
a first bearing part and a second bearing part pivotable relatively to each other, and
a lubricant and a contact zone between the first bearing part and the second bearing part at least when the hydrodynamic rotary bearing is at rest;
a support structure comprising a first ring-shaped projection; and
a rotating shaft,
wherein the support structure and the rotating shaft having a centre axis which rotating shaft and support structure are pivotable supported against each other via the hydrodynamic rotary bearing,
wherein a shape of the rotating shaft and a shape the support structure are such that when they are arranged on the hydrodynamic rotary bearing that the contact zone of the hydrodynamic rotary bearing is submerged in the lubricant even when the hydrodynamic rotary bearing is at rest,
wherein the first ring-shaped projection of the support structure is connected to the second bearing part, and
wherein the first bearing part is an outer bearing sleeve and the second bearing part is an inner ring.

2. The device according to claim 1,
wherein the rotating shaft comprises a second ring-shaped projection having an outer ring-shaped surface and an inner ring-shaped surface in relation to the centre axis of the rotating shaft, and
wherein a first bearing part of a second hydrodynamic rotary bearing is arranged on the inner ring-shaped surface of the second ring-shaped projection of the rotating shaft.

3. The device according to claim 1,
wherein the support structure comprises a cylindrical or a second ring-shaped projection, and
wherein the cylindrical or the second ring-shaped projection of the support structure is connected to a second bearing part of a second hydrodynamic rotary bearing.

4. The device according to claim 1, wherein the rotating shaft carries a rotor arrangement of a generator.

5. The device according to claim 1, wherein the support structure is a support structure of a stator arrangement of a generator.

6. The device according to claim 5, wherein the generator is a direct drive generator provided for a wind turbine.

7. A wind turbine comprising:
a device according to claim 1.

8. The wind turbine according to claim 7, wherein the first bearing part is an outer bearing sleeve and the second bearing part is an inner ring of the hydrodynamic rotary bearing.

9. A device, comprising:
a hydrodynamic rotary bearing, comprising:
a first bearing part and a second bearing part pivotable relatively to each other, and
a lubricant and a contact zone between the first bearing part and the second bearing part at least when the hydrodynamic rotary bearing is at rest;
a support structure; and
a rotating shaft,
wherein the support structure and the rotating shaft having a centre axis which rotating shaft and support structure are pivotable supported against each other via the hydrodynamic rotary bearing,
wherein a shape of the rotating shaft and a shape the support structure are such that when they are arranged on the hydrodynamic rotary bearing that the contact zone of the hydrodynamic rotary bearing is submerged in the lubricant even when the hydrodynamic rotary bearing is at rest,
wherein the rotating shaft comprises a first ring-shaped projection having an outer ring-shaped surface and an inner ring-shaped surface in relation to the centre axis of the rotating shaft, and
wherein the first bearing part of a first hydrodynamic rotary bearing is arranged on the inner ring-shaped surface of the first ring-shaped projection of the rotating shaft.

10. The device according to claim 9,
wherein the rotating shaft comprises a second ring-shaped projection having an outer ring-shaped surface and an inner ring-shaped surface in relation to the centre axis of the rotating shaft, and
wherein the first bearing part of a second hydrodynamic rotary bearing is arranged on the inner ring-shaped surface of the second ring-shaped projection of the rotating shaft.

11. The device according to claim 9,
wherein the support structure comprises a cylindrical or a second ring-shaped projection, and wherein the cylindrical or the second ring-shaped projection of the support structure is connected to the second bearing part of the second hydrodynamic rotary bearing.

12. A wind turbine comprising:
a hydrodynamic rotary bearing, comprising:
   a first bearing part and a second bearing part pivotable relatively to each other, and
   a lubricant and a contact zone between the first bearing part and the second bearing part at least when the hydrodynamic rotary bearing is at rest;
a support structure; and
a rotating shaft,
wherein the support structure and the rotating shaft having a centre axis which rotating shaft and support structure are pivotable supported against each other via the hydrodynamic rotary bearing,
wherein a shape of the rotating shaft and a shape the support structure are such that, when they are arranged on the hydrodynamic rotary bearing, the contact zone of the hydrodynamic rotary bearing is submerged in the lubricant even when the hydrodynamic rotary bearing is at rest,
wherein the rotating shaft comprises a first ring-shaped projection having an outer ring-shaped surface and an inner ring-shaped surface in relation to the centre axis of the rotating shaft, and
wherein the first bearing part of a first hydrodynamic rotary bearing is arranged on the inner ring-shaped surface of the first ring-shaped projection of the rotating shaft.

13. The wind turbine according to claim 12,
wherein the rotating shaft comprises a second ring-shaped projection having an outer ring-shaped surface and an inner ring-shaped surface in relation to the centre axis of the rotating shaft, and
wherein the first bearing part of a second hydrodynamic rotary bearing is arranged on the inner ring-shaped surface of the second ring-shaped projection of the rotating shaft.

14. The wind turbine according to claim 13,
wherein the support structure comprises a cylindrical or a second ring-shaped projection, and
wherein the cylindrical or the second ring-shaped projection of the support structure is connected to the second bearing part of the second hydrodynamic rotary bearing.

* * * * *